(12) United States Patent
Simon

(10) Patent No.: US 7,370,196 B2
(45) Date of Patent: *May 6, 2008

(54) CONTROLLED-CONTENT RECOVERABLE BLINDED CERTIFICATES

(75) Inventor: Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

This patent is subject to a terminal disclaimer.

(21) Appl. No.: 10/963,301

(22) Filed: Oct. 12, 2004

(65) Prior Publication Data

US 2005/0066171 A1    Mar. 24, 2005

Related U.S. Application Data

(63) Continuation of application No. 09/543,056, filed on Apr. 5, 2000, now Pat. No. 6,871,276.

(51) Int. Cl.
*H04L 9/12* (2006.01)
*H04L 9/32* (2006.01)

(52) U.S. Cl. .................... 713/156; 713/180; 380/30; 380/44

(58) Field of Classification Search ................ 380/280
See application file for complete search history.

(56) References Cited

U.S. PATENT DOCUMENTS

| 4,759,063 | A | 7/1988 | Chaum |
|---|---|---|---|
| 4,949,380 | A | 8/1990 | Chaum |
| 5,604,805 | A | 2/1997 | Brands |
| 5,659,616 | A | 8/1997 | Sudia |
| 5,903,882 | A | 5/1999 | Asay et al. |
| 5,982,898 | A | 11/1999 | Hsu et al. |
| 6,052,467 | A | 4/2000 | Brands |
| 6,108,644 | A | 8/2000 | Goldschlag et al. |
| 6,212,634 | B1 | 4/2001 | Geer et al. |
| 6,763,459 | B1 | 7/2004 | Corella |
| 6,871,276 | B1 * | 3/2005 | Simon .................. 713/156 |

OTHER PUBLICATIONS

Chaum David; "Online Cash Checks"; 1998; pp. 288-293, in parent app.
Stubblebine et al.; "Unlinkable Serial Transactions: Protocols and Applications"; ACM Transactions on Information and Systems Security, vol. 2, Issue 4, Nov. 1999; pp. 354-389; ISSN:1094-9224.

* cited by examiner

*Primary Examiner*—Christian LaForgia
(74) *Attorney, Agent, or Firm*—Lee & Hayes, PLLC

(57) ABSTRACT

In a cryptographic system, a certificate is used to provide information regarding a client device. The certificate is blindly signed by a certifying authority to preserve the anonymity of the client device. However, information is encoded into the signature so that a content server can readily verify security attributes of the client device and make decisions regarding the delivery of electronic content to the client device based on those security attributes.

27 Claims, 7 Drawing Sheets

248
$e^1 e^4 e^9 e^{12}$ = 100100001001000

250
$e^2 e^3 e^5 e^6 e^7 e^8 e^{10} e^{11} e^{13} e^{14} e^{15}$ = 011011110110111

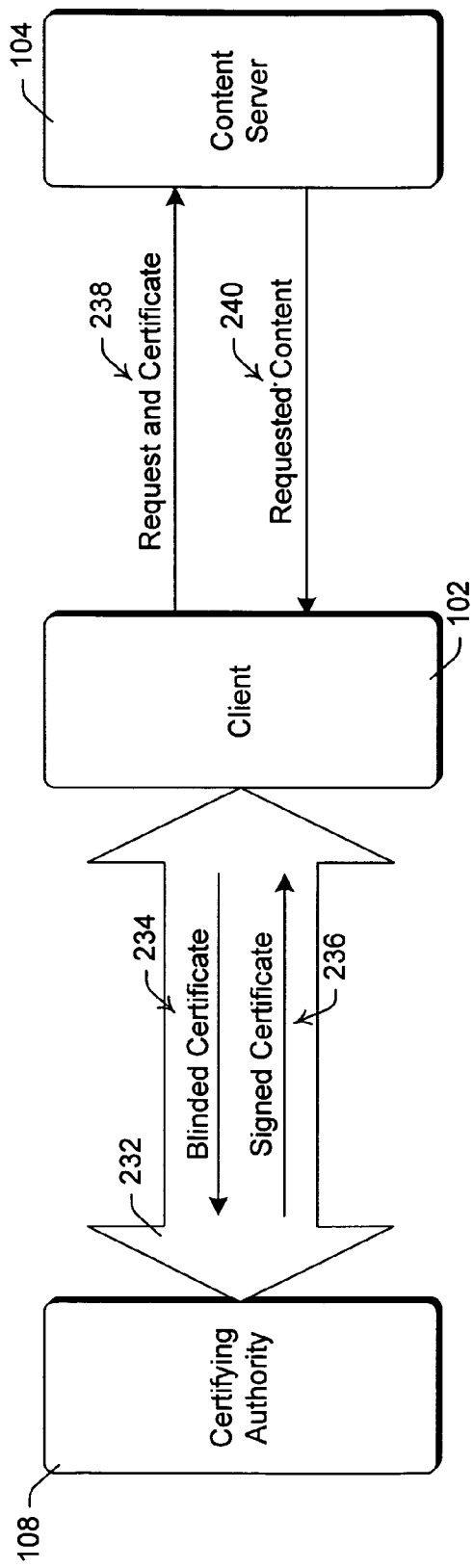

CONTROLLED-CONTENT RECOVERABLE BLINDED CERTIFICATES

RELATED APPLICATIONS

This is a continuation of application Ser. No. 09/543,056, filed Apr. 5, 2000 now U.S. Pat. No. 6,871,276, entitled "Controlled-Content Recoverable Blinded Certificates", which is hereby incorporated by reference herein.

TECHNICAL FIELD

This invention relates to cryptography. More particularly, the invention relates to generating and using controlled-content recoverable blinded certificates.

BACKGROUND OF THE INVENTION

The number of people using computers, as well as the tasks they are used to perform, is continually increasing. The Internet is one example of such an increase—more and more people are communicating with one another, researching information, and purchasing goods and services over the Internet. However, accompanying this increasing usage of computers and the Internet is an increasing concern about user-privacy, including concerns that individual's purchasing and researching (or "web surfing") behavior is being monitored by others.

A user can connect to the Internet at any time of day or night and purchase electronic content that is immediately transferred to his or her computer (a process referred to as "downloading"). Examples of such content include music (e.g., MP3 compressed audio files), text (e.g., electronic books), software applications, etc. In order to obtain electronic content over the Internet, the seller or other provider of such content often desires some assurances regarding the security of the device requesting the content (e.g., the user's computer). Such assurances indicate to the seller/provider that the electronic content obtained will not be used inappropriately. For example, an assurance that music files transferred to the device will not be improperly copied to another device.

Most users are willing to abide by such "proper usage" requirements for the content they download. However, many are unwilling to forgo any personal privacy in order to do so. For example, many users would be willing to accept a mechanism that gave the seller/provider the desired assurances regarding the security of their computer (or other device), but do not want their identity revealed in order to do so.

One way in which these assurances can be made to the seller/provider is for the requesting device to authenticate itself to the seller/provider. Such authentication typically involves the requesting device identifying itself to the seller/provider, either directly or indirectly via the authentication mechanism. This identification, however, can also allow the user's behavior to be tracked. For example, if a user continually uses the same public key for public key encryption when obtaining electronic content, then the user can be tracked using that key. Given the ability to track users using such mechanisms, they are unlikely to achieve widespread user acceptance.

The invention described below addresses these disadvantages by providing controlled-content recoverable blinded certificates.

SUMMARY OF THE INVENTION

In a cryptographic system, a certificate is used to provide information regarding a client device. The certificate is blindly signed by a certifying authority to preserve the anonymity of the client device. However, information is encoded into the signature so that a content server can readily verify attributes of the client device.

According to one aspect of the invention, a public key cryptographic system is used in which the client device can generate new public/private key pairs at will. A new public key is incorporated into a certificate and blindly signed by the certifying authority. As the certificate is blinded, the certifying authority does not know the exact content of what is being signed, but does encode into the signature the same information as was in the signature of the last certificate it signed for the client device. By changing public keys the client device can prevent other devices from tracking it based on its public key, and by having the new certificate (with the new public key) blindly signed the client device can prevent the certifying authority from equating the previous public key to the new public key.

According to another aspect of the invention, the client device is recoverable from a failure of the client device during the process of obtaining a new public key. Such a failure could result in a loss of the information used to generate the new public keys. The client device can recover from such a failure by using a fixed "pseudo-random" number generator to generate "random" numbers based on a fixed seed value. The client device can readily re-generate its previous public/private key pairs using this number generator. Each generated public key is submitted to a certificate archive to determine whether a current valid certificate exists for that public key. The generation and checking process continues until a public/private key pair is generated for which a valid certificate exists.

BRIEF DESCRIPTION OF THE DRAWINGS

The present invention is illustrated by way of example and not limitation in the figures of the accompanying drawings. The same numbers are used throughout the figures to reference like components and/or features.

FIG. 4 is a block diagram illustrating an exemplary data flow for blindly signing certificates and using the certificates to obtain electronic content according to one embodiment of the invention.

DETAILED DESCRIPTION

The discussion herein assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Network Structure

Figure 1:
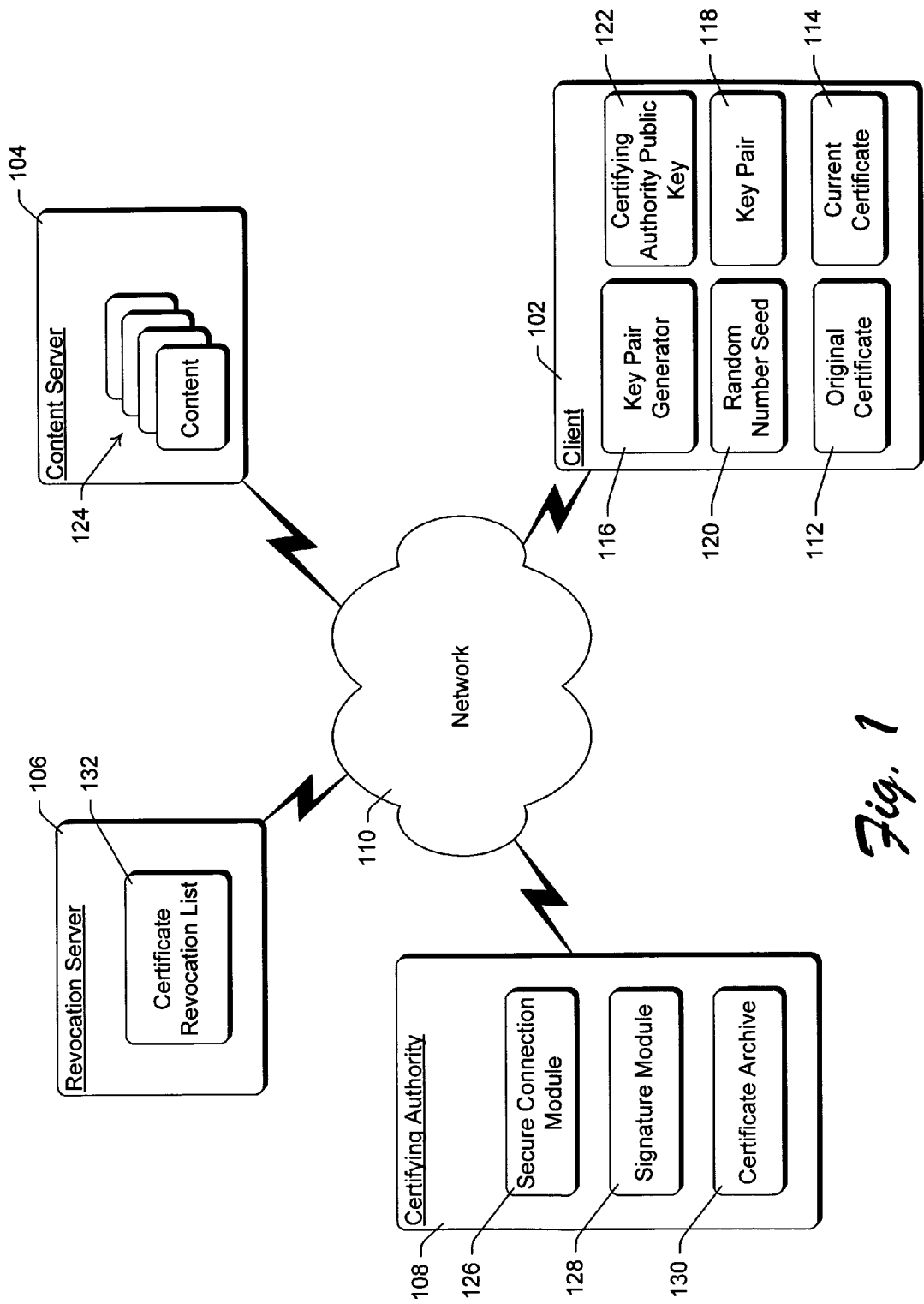
FIG. 1 shows a client/server network system and environment in accordance with one embodiment of the invention.

FIG. 1 shows a client/server network system and environment in accordance with one embodiment of the invention. Generally, the system includes one or more client devices 102, one or more content servers 104, one or more revocation servers 106, and one or more certifying authorities 108. The client devices 102, servers 104 and 106, and certifying authorities 108 communicate with one another over a data communications network. The data communications network in FIG. 1 is a public network 110, such as the Internet. The data communications network might also include local-area networks and/or private wide-area networks, and can include both wired and wireless sections. Alternatively, one or more of client devices 102, servers 104 and 106, and certifying authorities 108 may communicate with each other directly rather than via network 110.

Client device 102 includes an original certificate 112 that identifies various security-related attributes of client device 102. In the illustrated example, certificate 112 is part of a central processing unit (CPU) of client device 102 and is incorporated into the CPU when the CPU is manufactured (or alternatively when client device 102 is manufactured). Client device 102 also includes a current certificate 114. Current certificate 114 is initially the same as original certificate 112, but may be subsequently changed, as discussed in more detail below.

Client device 102 further includes a key pair generator 116 that generates a key pair 118 including a public key and a private key for the device 102. In the illustrated example, generator 116 generates a key pair in a conventional manner according to the well-known RSA (Rivest, Shamir, and Adelman) encryption technique. A random number seed 120 provides a fixed seed value to be used by generator 116 in generating a key pair and recovering its state if necessary, as discussed in more detail below.

Client device 102 also includes a public key 122 for certifying authority 108. Public key 122 allows client device 102 to establish a secure communications link to certifying authority 108 via network 110, as discussed in more detail below.

Content server 104 includes various electronic content 124 that can be transferred to client 102 via network 110 (also referred to as "downloading"). Content 124 represents any type of electronic content, such as audio content (e.g., songs), video content (e.g., movies), textual content (e.g., articles, books, magazines or newspapers), software (e.g., complete applications, upgrades, or fixes), etc. Content 124 can include different titles (e.g., multiple different songs and software applications) as well as different versions of the same content (e.g., different quality versions of the same song). To download content 124, client device 102 requests the appropriate content 124 from content server 104. Based on the requested content and the various attributes of client device 102 (e.g., its security attributes), content server 104 determines which content (or which version of particular content), if any, it will transfer to client device 102.

Certifying authority 108 certifies public keys generated by client device 102. This certification provides a verification to content server 104 that the public key presented to server 104 by client 102 is actually from client 102 and that client 102 has the attributes that it claims to have. Certifying authority 108 includes a secure connection module 126 to establish a secure connection to client 102 via network 110, and a signature module 128 that certifies the public keys generated by client device 102 by "signing" the keys, as discussed in more detail below. Certifying authority 108 also includes a certificate archive 130 that is a record of currently valid (non-revoked) certificates that have been signed by certifying authority 108. A new certificate is added to certificate archive 130 and the corresponding previous certificate removed from certificate archive 130 by client device 102 (or alternatively certifying authority 108) when the new certificate is created or signed. Certificate archive 130 can be used by client 102 in the event it is recovering the state of key pair generator 116 or the current key pair 118, as discussed in more detail below.

Revocation server 106 maintains a certificate revocation list 132 that identifies revoked certificates. Certificates of client device 102, as well as other client devices coupled to network 110, identify the public key and other attributes of those devices. Certifying authority 108, in conjunction with client device 102, can generate and certify a new certificate having a new public key. During the certification process, client device 102 (or alternatively certifying authority 108) also revokes the previous certificate used by client device 102. The previous certificate is revoked so that the previous certificate (and thus the previous public key) of client device 102 is no longer valid. Certificate revocation list 132 is a record of these revoked certificates. Alternatively, previous certificates may not be revoked.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention can be implemented in hardware or a combination of hardware, software, and/or firmware. For example, the invention can be implemented using one or more application specific integrated circuits (ASICs).

Figure 2:
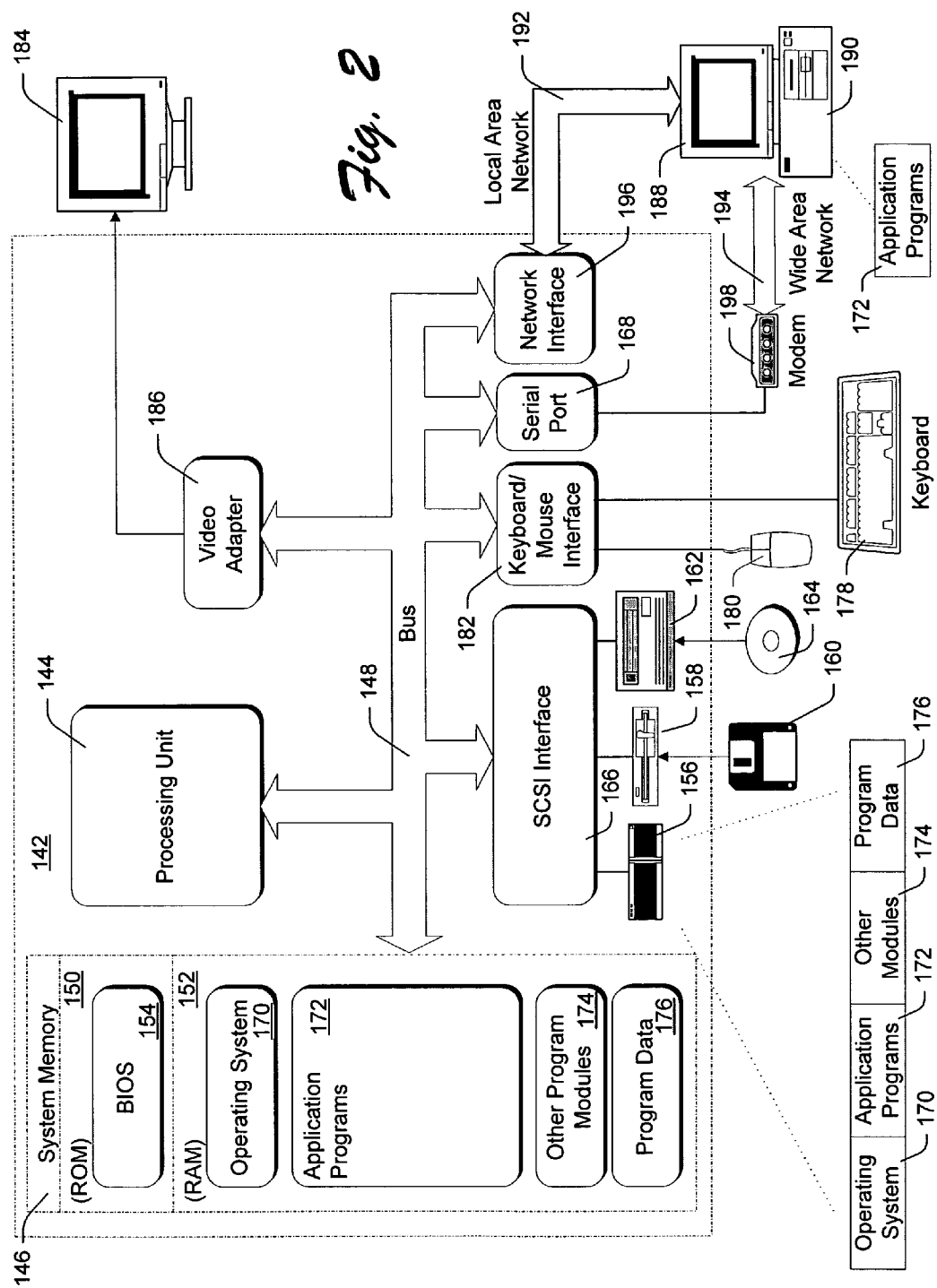
FIG. 2 shows a general example of a computer that can be used in accordance with the invention.

FIG. 2 shows a general example of a computer 142 that can be used in accordance with the invention. Computer 142 is shown as an example of a computer that can perform the functions of client device 102, content server 104, revocation server 106, or certifying authority 108 of FIG. 1. Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM)

152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the system bus 148 by an SCSI interface 166 or some other appropriate interface. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client Certificates

Figures 3, 5:
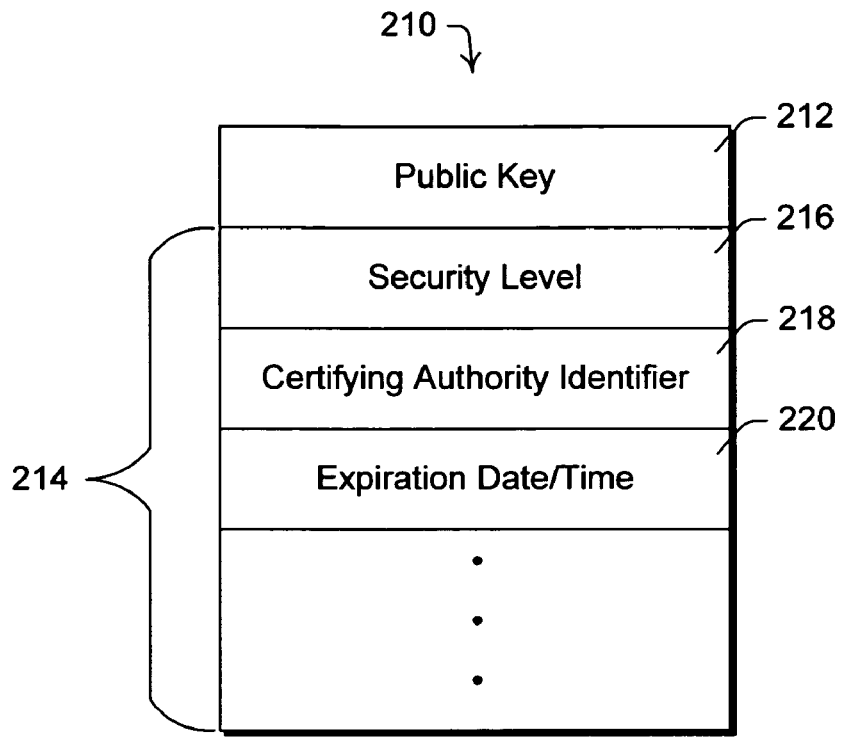
FIG. 3 illustrates an exemplary certificate that can be used in accordance with the invention.
FIG. 5 illustrates an example of the bit encoding according to one embodiment of the invention.

Client device 102 can provide information about itself to content server 104 via a certificate previously signed by a certifying authority. FIG. 3 illustrates an exemplary certificate 210 that includes a public key 212 and one or more attributes 214. Public key 212 is the current public key (in accordance with RSA cryptography) being used by client device 102. Attributes 214 identify various characteristics of client device 102, such as what type of device client 102 is or how client 102 was constructed. For example, attributes may identify client device 102 as a particular type of device (e.g., a personal computer with an Intel® microprocessor, a personal MP3 audio player, or an Internet browsing device such as a WebTV® terminal or a gaming console), or a device with particular security characteristics (e.g., a computer with an Intel®) microprocessor built to run only the Microsoft® Windows NT® operating system). In the illustrated example, attributes 214 include a security level 216 of client device 102 (e.g., a numeric level of a predefined set of security levels) and an identifier 218 of certifying authority 108. Additionally, an expiration date and time 220 may be included in attributes 214, identifying when certificate 210 will expire (no longer be valid).

Client device 102 includes a processor (such as processing unit 144 of FIG. 2) that is capable of performing cryptographic functions, such as signing, encrypting, decrypting, and authenticating. An additional cryptographic accelerator (not shown) may also be included to assist the processor with intensive mathematical computations commonly involved in cryptographic functions.

The processor manufacturer equips processor 144 with a pair of public and private keys 118 that are unique to the processor 144, and thus unique to device 102. Other physical implementations may include storing the key on an external device to which the main processor has privileged access (where the stored secrets are inaccessible to arbitrary application or operating system code). The private key is never revealed and is used only for the specific purpose of signing stylized messages, as discussed below in more detail.

The processor manufacturer also issues a signed original certificate 112 testifying that it produced the processor according to a known specification and including the attributes 214 of FIG. 3. Generally, the certificate 112 testifies that the manufacturer created the key pair 118, placed the key pair onto the processor 144, and then destroyed its own knowledge of the private key, or alternatively that the private key was generated internally in the device, and the public key was obtained from it under controlled circumstances by the manufacturer. In this way, nobody but the client device 102 knows the client device private key; the same key is not issued to other processors. The certificate can in principle be stored on a separate physical device but still logically belongs to the processor with the corresponding key. Alternatively, the manufacturer of client device 102 rather than the processor 144 may equip client device 102 with the public/private key pair 118 and certificate 112.

In order for the client device 102 to cryptographically sign a message (e.g., a certificate), its public key (from key pair 118) is made known to the device(s) that will receive the message. The public key can be included in non-encrypted form along with the signed message, or may otherwise be made publicly known. Making the public key publicly known, however, can result in the loss of at least some anonymity of the client device 102. If the client device 102 continually uses the same public key, then that public key can become associated with device 102 and the transactions conducted, information obtained, etc. can be tracked based on the public key.

The invention solves this problem by allowing client device 102 to change key pair 118. A new key pair can be generated by generator 116 and the new public key incorporated into a certificate that is forwarded to certifying authority 108 for certification. The certificate is blinded so that certifying authority 108 does not know the value of the new public key and thus cannot associate the new public key with the previous public key. However, the certifying authority 108 digitally signs the certificate from client device 102 and encodes some (or all) of the same attributes into the new certificate (with the new public key) as were associated with the previous certificate used by client device 102. Thus, client device 102 is able to generate a new key pair and have the public key certified as having the same attributes as the previous key without revealing any information regarding the identity of client device 102.

FIG. 4 is a block diagram illustrating an exemplary data flow for blindly signing certificates and using the certificates to obtain electronic content according to one embodiment of the invention. The client device 102 and certifying authority 108 establish a secure connection 232 between themselves (e.g., via network 110 of FIG. 1). The client device 102 generates a new key pair, incorporates the new public key into a new certificate, blinds the new certificate, and transmits the blinded certificate 234 to certifying authority 108 via the secure connection 232. Client device 102 also requests that certifying authority 108 sign the certificate indicating that client device 102 has all or many of the same attributes as the previous certificate used by client device 102. Certifying authority 108 verifies that the blinded certificate 234 is to have the same attributes as the previous certificate based on information encoded in the previous signed certificate. If certifying authority 108 can verify such, then it issues a new signed certificate 236 for blinded certificate 234; otherwise it will not issue signed certificate 236.

Signed certificate 236 is received by client 102 and stored as current certificate 114 of FIG. 1. Signed certificate 236 gives client 102 a valid certificate in which is encoded various attributes. However, since certifying authority 108 issued signed certificate 236 based on a blinded certificate, certifying authority 108 has no knowledge of what the public key in that certificate is.

Client 102 can then use its new public key to obtain electronic content from content server 104. Client 102 forwards the current certificate and a request for content 238 to content server 104. Alternatively, a secure connection between client 102 and content server 104 may be established analogous to secure connection 232 between client 102 and certifying authority 108. Content server 104 evaluates the request and certificate 238 to determine what content, if any, to deliver to client 102 and/or how to deliver the content to client 102 (e.g., what fee to charge, how to collect the fee, what additional security precautions to insist on, etc.). This determination is made by content server 104, at least in part, by evaluating the attributes encoded in the certificate received from client 102. Based on its evaluation, content server 104 forwards the appropriate requested content 240 in the appropriate manner to client device 102.

The invention makes use of public key cryptography to encrypt and decrypt information as well as to digitally sign and verify messages. The invention is described using the well-known RSA algorithm. Alternatively, other public key cryptographic algorithms could be used, such as well-known elliptic curve cryptosystems or well-known Diffie-Hellman key agreement protocols.

Secure connection 232 is established by client 102 and certifying authority 108 generating a session key. According to one implementation, the session key is generated using the client public key and the certifying authority public key. The client 102 selects a random value, encrypts the random value with the certifying authority public key 122 of FIG. 1, and sends the encrypted random value to certifying authority 108 along with current certificate 114 (which includes the client public key). The certifying authority 108 also selects a random value, encrypts the random value with the client public key, and sends the encrypted random value to client 102. Each of the client 102 and certifying authority 108 can decrypt the encrypted random values they receive using their respective private keys. The client 102 and certifying authority 108 then combine the two random values in some known manner (e.g., adding the two values, concatenating the two values, etc.) to generate the session key. All subsequent communications between client 102 and certifying authority 108 via secure connection 232 are encrypted in a conventional manner using this session key.

The public and private keys are generated and used in accordance with RSA. Using RSA, two large prime numbers p and q are selected and multiplied to generate a product n. A value e is also generated and is relatively prime to (p−1)(q−1). A value of d, which is the inverse of e is also determined, such that:

$$ed=1\ mod(p-1)(q-1)$$

The private key then is the pair p and q, or alternatively d, and the public key is the pair n and e.

A message m (e.g., a series of numbers representing a textual message, such as the ASCII values for alphanumerics) can be encrypted to generate $m_{encrypt}$ via the following formula:

$$m_{encrypt} = m^e (mod\ n)$$

The intended recipient of the message knows the private key and can easily decrypt the message using the following formula:

$$m = (m_{encrypt}^e)^d (mod\ n)$$

However, no known algorithm can efficiently decrypt the encrypted message $m_{encrypt}$ without knowing the private key.

A message m can similarly be digitally signed by the owner of the private key to generate $m_{signed}$ via the following formula:

$$m_{signed} = m^d (mod\ n)$$

Anyone else that knows the public key can decrypt the signed message $m_{signed}$ and verify that it was indeed signed using the private key corresponding to the public key using the following formula:

$$m = (m_{signed}^d)^e (mod\ n)$$

The invention can also have a message m be blindly signed. A blindly signed message is one that is digitally signed without the device doing the signing having any knowledge of the underlying message. Thus, client 102 can have certifying authority 108 sign a message m (e.g., including a new public key) without certifying authority 108 having any knowledge of the actual content of message m (e.g., the new public key). The blinding process is carried out by client 102 generating a value x and multiplying the message m by the value $x^e$. The blinded message $mx^e$ is then sent to certifying authority 108, which signs the blinded message according to the following formula:

$$mx_{signed} = (mx^e)^d (mod\ n)$$

This value is returned to client 102, which can easily generate the signed message ($m^d (mod\ n)$) according to the following:

$$(mx^e)^d (mod\ n) = m^d (x^e)^d (mod\ n) = m^d (x)(mod\ n)$$

As client 102 generated x, it can easily divide this result by x leaving the signed message ($m^d (mod\ n)$).

The digital signature (whether blind or otherwise) can also be carried out using a conventional one-way hash function, such as Secure Hash Algorithm-1 (SHA-1) or Message Digest 5 (MD5). A one-way hash function is a mathematical function that, given an input message, generates an output "hash value". The one-way hash function is chosen such that it is conjectured to be infeasible, knowing the one-way hash function and given a particular hash value, to find a message which produces the particular hash value. The one-way hash function being used is made publicly known, allowing verification of what was signed.

One-way hash functions can be used with the invention in different manners. According to one implementation, client device 102 uses a hash function to generate a hash value for the certificate, blinds the hash value, and forwards the blinded hash value to certifying authority 108 for signature. Content server 104 could then use the known hash function to generate a hash value for the certificate it receives from client device 102 and verify that it is the same certificate as was presented to certifying authority 108 if the hash value it computes is the same as the digitally signed hash value.

Information is encoded into the digital signature by choice of the public key portion e. The value of e is the product of multiple integers $e^i$. The presence of a particular integer $e^i$ indicates a value of one (or alternatively zero), whereas the absence of a particular integer $e^i$ indicates a value of zero (or alternatively one). This results in the value e encoding a series of bit values. An additional level of security is added by generating a second value $e_2$ which is a product of all of the integers which were not included in e. Each message (e.g., a certificate) would then be signed twice, once with the value of e and once with the value of $e_2$. Both of these signed messages would then be verified by content server 104 in determining whether to provide content to client device 102.

The values of the integers $e^i$ should be chosen to be relatively prime to (p−1)(q−1). This can be accomplished, for example, by choosing values of p and q such that (p−1) and (q−1) are both twice a prime number, and skipping the value two when choosing $e^i$ values.

Additionally, with the value of e selected, the corresponding value of d, which is a product of multiple integers $d^i$, can be readily determined. The value of each integer $d^i$ can be determined by calculating the value such that $e^i d^i = 1 mod(p-1)(q-1)$.

FIG. 5 illustrates an example of the bit encoding according to one embodiment of the invention. In the illustrated example, up to fifteen different integers $e^i$ are included. In the example encoding 248, the first, fourth, ninth and twelfth integers $e^i$ are included, resulting in the encoded value of 100100001001000. In the example encoding 250, the second, third, fifth, sixth, seventh, eighth, tenth, eleventh, thirteenth, fourteenth, and fifteenth integers $e^i$ are included, resulting in the encoded value of 011011110110111.

The information encoded into the digital signature identifies various attributes of client device 102. In one implementation, each of the attributes 216, 218, and 220 included in certificate 210 of FIG. 3 are encoded into the digital signature. The encoding can further be seen from the following example. Assume that eight different security levels are predefined, one of which is identified as security level 216 of certificate 210. Three different values $e^i$ (e.g., $e^1$, $e^2$, and $e^3$) are used to encode the security level 216 into the signature. Thus, assuming that a security level of five would be encoded as its binary representation ($101_2$), then the values encoded into the digital signature as $e^1$, $e^2$, and $e^3$ would be 1, 0, and 1, respectively.

By way of further example, assume that the values of the fifteen integers $e^i$ are as indicated in Table I below.

TABLE I

| Integer | Value |
|---|---|
| $e^1$ | 3 |
| $e^2$ | 5 |
| $e^3$ | 7 |
| $e^4$ | 11 |
| $e^5$ | 13 |
| $e^6$ | 17 |
| $e^7$ | 19 |
| $e^8$ | 23 |
| $e^9$ | 29 |
| $e^{10}$ | 31 |
| $e^{11}$ | 37 |
| $e^{12}$ | 41 |

TABLE I-continued

| Integer | Value |
| --- | --- |
| $e^{13}$ | 43 |
| $e^{14}$ | 47 |
| $e^{15}$ | 53 |

Using the values listed in Table I, the value of encoding 248 would be 3·11·29·41, the product of which is 39,237. Similarly, the value of encoding 250 would be 5·7·13·17·19·23·31·37·43·47·53, the product of which is 11,223,947,638,085.

Certifying authority 108 uses this value e with encoded information to sign the blind certificate it receives from client device 102. Certifying authority 108 generates the signature for the new certificate based on the encoded information in the previous certificate's signature (the previously signed certificate from client device 102 was received during the establishment of secure connection 232 of FIG. 4). For the first certificate signed by certifying authority 108 for client device 102, there is no previously signed certificate. Thus, certifying authority 108 relies on the digital signature of the manufacturer on original certificate 112 of FIG. 1 to verify the certificate and encodes the attributes from original certificate 112 into the signature. Certifying authority 108 can thus ensure that it does not attribute any greater level of security to the device when encoding information into the new certificate than was encoded into the previous certificate.

Certifying authority 108 may, however, modify the information encoded in the new signature. For example, an expiration date and time for the certificate may be encoded into the signature, indicating that the certificate is valid for a period of six months after issuance. Thus, each time the client device 102 requests a new signed certificate, certifying authority 108 encodes the new expiration date and time into the new signature.

In order to obtain content from content server 104, client device 102 forwards a request for content and its current signed certificate 238 to content server 104. The signed certificate makes a representation to content server 104 of various attributes of client device 102. Content server 104 verifies these attributes using the information encoded into the digital signature.

Both the public key portion n and the encodings for e used by certifying authority 108 are made known to content server 104. The public key portion n and the encodings for e can be made publicly known, or alternatively can be communicated securely (e.g., using public-key encryption) to content server 104 from certifying authority 108. Given the attributes that client device 102 claims to have, and the encodings used by certifying authority 108 in signing client certificates, content server 104 can readily determine whether the attributes encoded in the digital signature match the claimed attributes. For example, using the encodings a proposed value of e can be generated based on the claimed attributes. This proposed value of e can then be used, in conjunction with the public key portion n received from certifying authority 108, to verify the signature of the certificate.

If the claimed attributes are not verified, then content server 104 can refuse to provide content to client device 102. However, if the claimed attributes are verified, then content server 104 transmits the requested content 240 to client device 102. What content and/or how the content is transmitted to client device 102 can vary depending on the attributes of client device 102. For example, a fee may or may not be imposed, a particular quality level of content may be transmitted, confirmation from client device 102 of additional security precautions that must be taken, a licensing agreement accepted, etc.

Figure 6:
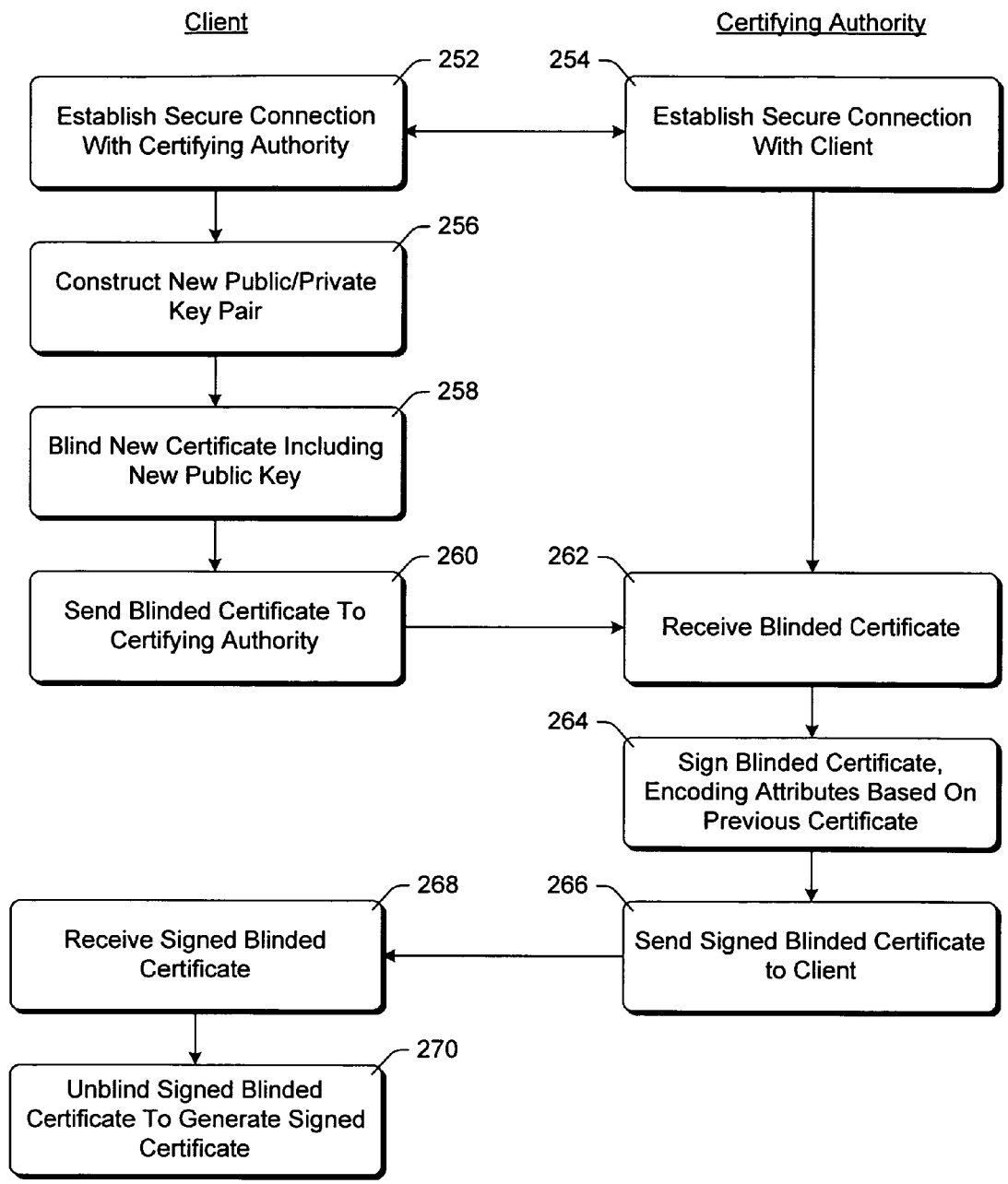
FIG. 6 is a flowchart illustrating an exemplary process for generating a new blindly signed certificate in accordance with one implementation of the invention.

FIG. 6 is a flowchart illustrating an exemplary process for generating a new blindly signed certificate in accordance with one implementation of the invention. Steps on the left side of FIG. 6 are implemented by client device 102 of FIGS. 1 and 4, while steps on the right side of FIG. 6 are implemented by certifying authority 108 of FIGS. 1 and 4. The process of FIG. 6 may be performed in software. FIG. 6 is described with additional reference to components in FIGS. 1 and 4.

Initially, client device 102 and certifying authority 108 establish a secure connection between each other (steps 252 and 254) based on the client's previous certificate (so that the certifying authority knows the correct attributes to encode into the new certificate). Client 102 then constructs a new public/private key pair (step 256). Client 102 then constructs a new certificate by replacing the public key in its current certificate with the new public key, and blinds the new certificate (step 258). Client 102 sends the blinded certificate to certifying authority 108 (step 260). Certifying authority 108 receives the blinded certificate (step 262) and signs the blinded certificate encoding attributes into the signature based on the previous certificate (step 264).

Certifying authority 108 then sends the signed blinded certificate to client device 102 (step 266). Client device 102 receives the signed blinded certificate (step 268), and unblinds the signed blinded certificate to generate the signed certificate (step 270).

Figure 7:
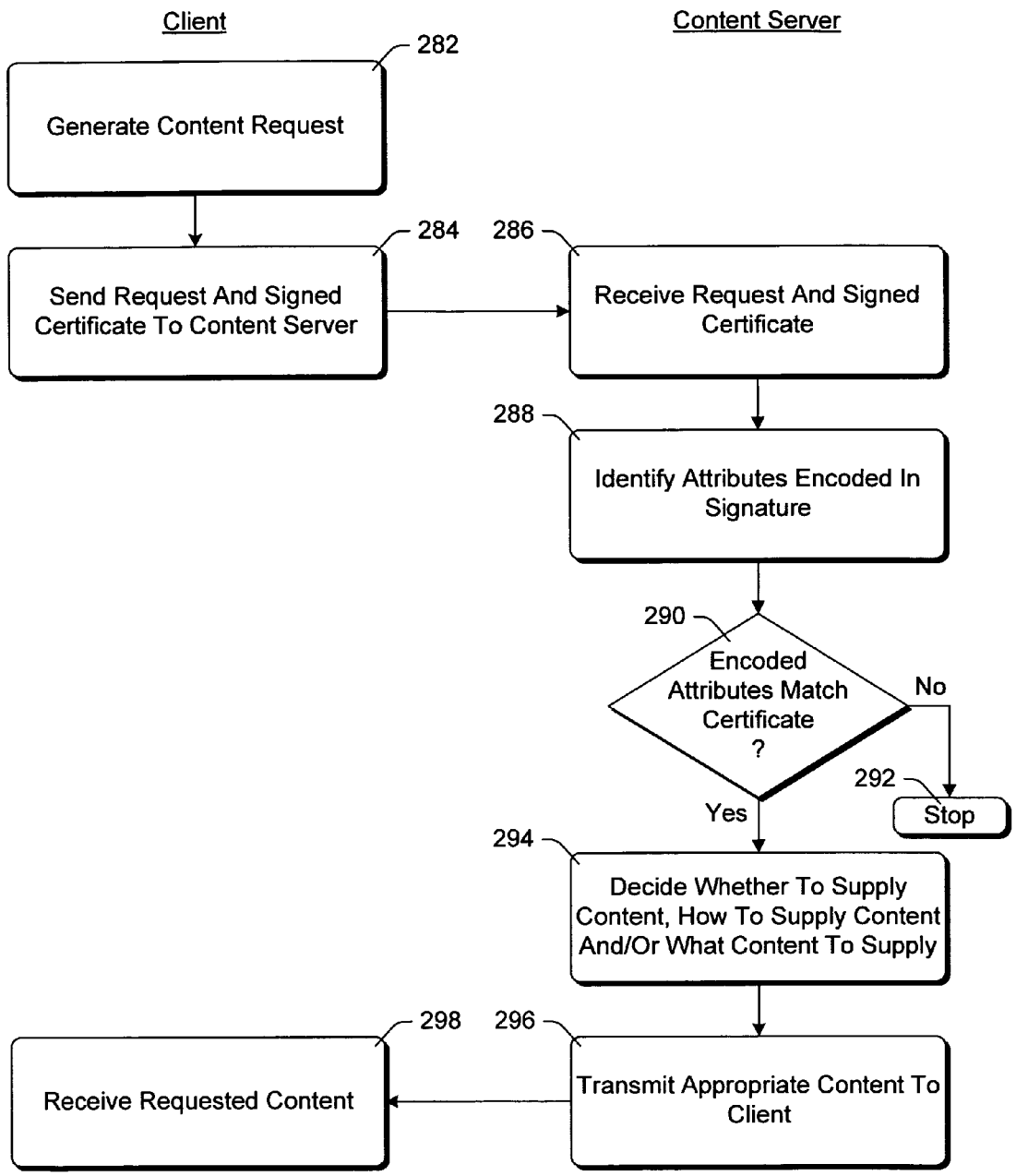
FIG. 7 is a flowchart illustrating an exemplary process for obtaining content using a new signed certificate in accordance with one implementation of the invention.

FIG. 7 is a flowchart illustrating an exemplary process for obtaining content using a new signed certificate in accordance with one implementation of the invention. Steps on the left side of FIG. 7 are implemented by client device 102 of FIGS. 1 and 4, while steps on the right side of FIG. 7 are implemented by content server 104 of FIGS. 1 and 4. The process of FIG. 7 may be performed in software. FIG. 7 is described with additional reference to components in FIGS. 1 and 4.

Initially, client device 102 generates a content request (step 282). This may be automatically generated by client device 102 or alternatively may be in response to a user request at client device 102. Client 102 sends the request and current certificate 114 (signed by certifying authority 108) to content server 104 (step 284).

Content server 104 receives the request and signed certificate (step 286), and identifies the attributes encoded in the signature (step 288). Content server 104 then checks whether the attributes in the certificate match the attributes encoded in the signature (step 290). If the attributes do not match, then the process stops (step 292), and content server 104 does not provide the requested content to client device 102. Content server 104 assumes that if the attributes do not match, the certificate has been tampered with and thus the certificate and client device 102 are not trustworthy. Thus, the content of the certificate is "controlled"—any attempts by a user to alter the certificate (e.g., to increase the security level of his or her device) would be detected.

However, if the attributes match, then content server 104 decides, based on the attributes, whether to supply content, how to supply content, and/or what content to supply to client 102 (step 294). Server 104 then transmits the appropriate content to client 102 (step 296), which receives the requested content (step 298).

Key Recovery

Returning to FIG. 1, a new key pair for client device 102 can be generated by key pair generator 116. Generator 116 includes a pseudo-random number generator that produces a string of "random" numbers based on a fixed initial seed value 120. Seed value 120 is fixed—it is stored in a manner so that it is not lost in the event of a system failure (e.g., it may be programmed into a nonvolatile read only memory). The state of the pseudo-random number generator is saved after a random number is generated so that the next time a random number is to be generated it can pick up from its most recent state. The pseudo-random number generator uses a fixed algorithm(s) to generate its "random" number output, such as RC4, available from RSA Security, Inc. of Bedford, Mass.

To generate a new key pair, generator 116 generates two random integers (via the pseudo-random number generator) and begins testing each integer, as well as the successors of each, for primality. The order in which successors are tested is fixed (and thus can be subsequently duplicated if necessary, as discussed in more detail below). Any of a wide variety of conventional techniques can be used to test for primality, such as the well-known Miller-Rabin or Solovay-Strassen techniques. Once a prime number has been identified from each sequence (which are the values p and q of the private key), the value of n for the public key can be readily generated by multiplying the two prime numbers.

Situations can arise where client 102 needs to re-generate previously generated public/private key pairs. For example, a failure of client device 102 at an inopportune moment may cause client 102 to lose its private key (e.g., erased from memory) and/or the random number generator to lose its current state. In such situations, client 102 re-starts its key pair generation process with seed value 120 to bring key pair generator 116 back to its previous state.

Figure 8:
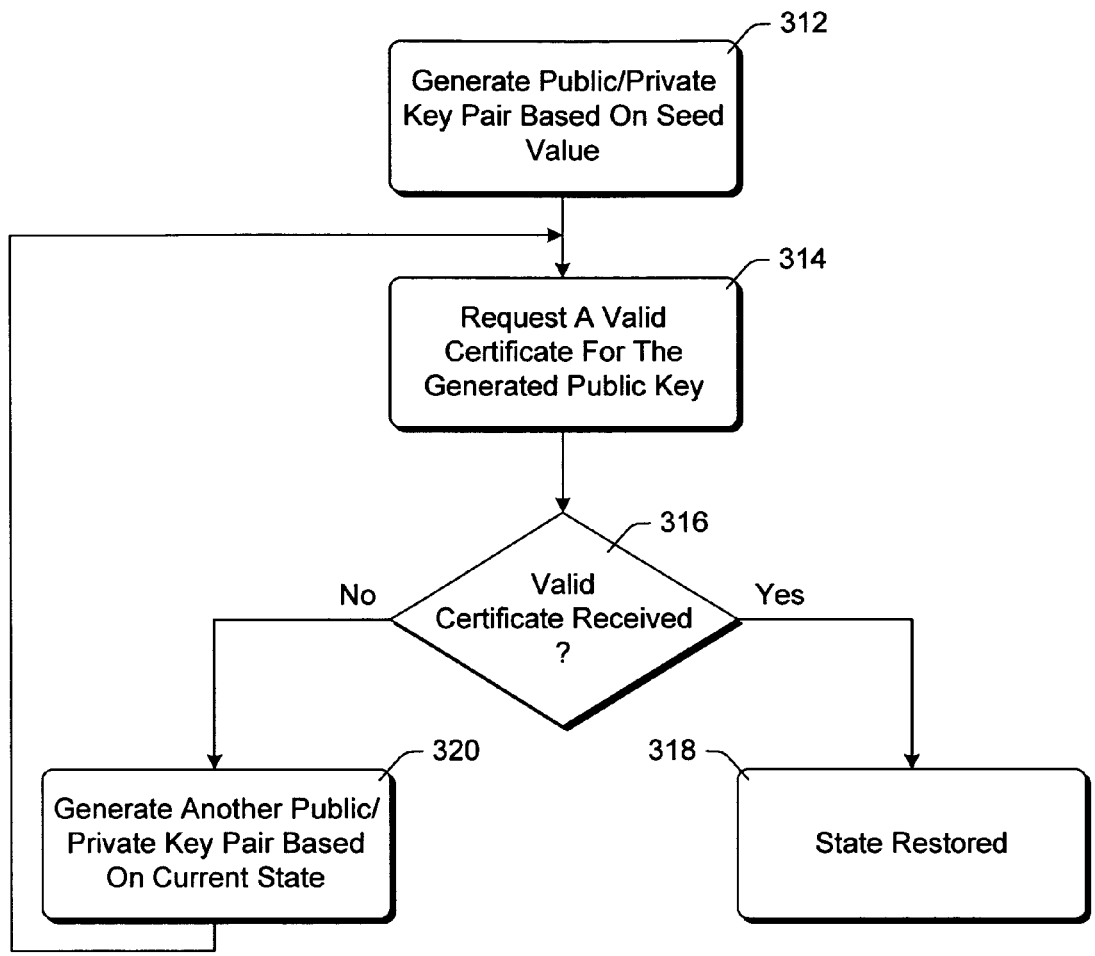
FIG. 8 is a flowchart illustrating an exemplary process for restoring a key pair generator to its proper state according to one embodiment of the invention.

FIG. 8 is a flowchart illustrating an exemplary process for restoring key pair generator 116 to its proper state according to one embodiment of the invention. The process of FIG. 8 is implemented by client device 102 of FIG. 1, and may be performed in software. FIG. 8 is described with additional reference to components in FIG. 1.

Initially, generator 116 generates a public/private key pair based on its seed value 120 (step 312). Because the seed value 120 has not changed and the algorithm(s) for generating the prime numbers of the private key are fixed, each time that generator 116 generates a public/private key pair using its seed value 120 the same public/private key pair will be generated. Generator 116 then requests a valid certificate for the generated public key (step 314). This request is made to a certificate server or archive, which is archive 130 in the illustrated example of FIG. 1.

The certificate server or archive will check whether a valid certificate exists for the public key and return either the valid certificate or an indication that no such certificate exists. Generator 116 checks whether it receives a valid certificate or an indication that no such certificate exists (step 316). If a valid certificate exists, then its state has been restored (step 318). However, if no such certificate exists then generator 116 generates another public/private key pair (step 320). Eventually, a valid certificate will be received and the state of generator 116 restored (step 318).

CONCLUSION

Thus, the invention provides controlled-content recoverable blinded certificates. A client device can readily create a new public key with a digital signature from a certifying authority and with security attributes of the client device advantageously encoded into the digital signature. A blinding process is used to blind the public key for signature, thereby preventing the certifying authority from tracking the client device based on the relationship between its previous public key and its new public key. A content server can use these encoded security attributes to determine whether and how to provide requested electronic content to the client device. Additionally, according to one aspect of the invention, the client device uses a fixed algorithm and a fixed seed value to generate public/private key pairs, thereby advantageously allowing the client device to recover from a failure during the process of changing its public key.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media containing a plurality of instructions that, when executed by one or more processors, causes the one or more processors to:

receive, from a client, a current certificate and a request to sign a new certificate;

determine attributes of the client based on the current certificate;

select, in accordance with public key cryptography, a public/private key pair that is based at least in part on the attributes of the client;

digitally sign the new certificate using the selected private key;

wherein to digitally sign the new certificate is to calculate a value of a formula (blinded certificate)$^d$mod(n), wherein d represents a private key of a device performing the digital signing and wherein n is a product of two prime numbers that comprise the private key; and wherein to select the public/private key pair is to:

represent the attributes as a series of bits;

identify, for each bit in the series that has a particular value, a corresponding integer; and generate as the value d the product of the identified integers.

2. One or more computer-readable media as recited in claim 1, wherein the plurality of instructions further causes the one or more processors to generate another digital signature for the blinded certificate by:

additionally identifying, for each bit in the series that has another value, a corresponding integer; and generating as the value d for the other digital signature the product of the additionally identified integers.

3. One or more computer-readable media as recited in claim 1, wherein the attributes are security attributes of the client.

4. One or more computer-readable media as recited in claim 1, wherein to determine how to respond is to determine what quality level of electronic content to provide.

5. One or more computer-readable media as recited in claim 1, wherein to determine how to respond is to determine what type of payment for the electronic content to require.

6. One or more computer-readable media as recited in claim 1, wherein to determine how to respond is to determine what additional security precautions are required on the part of the client.

7. One or more computer-readable media containing a plurality of instructions that, when executed by one or more processors, causes the one or more processors to:
   receive, from a client, a request for electronic content;
   check, based on information encoded in a digital signature of at least a portion of the request, whether the client has a set of claimed security attributes;
   determine how to respond to the request based on the check;
   wherein to check whether the client has the set of claimed security attributes is to:
      represent the set of claimed security attributes as a series of bits;
      generate a public key for a certifying authority using the series of bits; and
      use the public key to verify the digital signature; and
   wherein to generate the public key is to:
      identify, for each bit in the series that has a particular value, a corresponding integer; and
      generate as the public key the product of the identified integers.

8. A system comprising:
   a processor; and
   a memory coupled to the processor, the memory containing instructions that, when executed by the processor, cause the processor to:
      receive, from a client, a current certificate and a request to sign a new certificate;
      determine attributes of the client based on the current certificate;
      select, in accordance with public key cryptography, a public/private key pair that is based at least in part on the attributes of the client;
      digitally sign the new certificate using the selected private key;
      wherein to digitally sign the new certificate is to calculate a value of a formula $$(\text{blinded certificate})^d \mod(n),$$

wherein d represents a private key of a device performing the digital signing and wherein n is a product of two prime numbers that comprise the private key; and
   wherein to select the public/private key pair is to:
      represent the attributes as a series of bits;
      identify, for each bit in the series that has a particular value, a corresponding integer; and
      generate as the value d the product of the identified integers.

9. A system as recited in claim 8, wherein the instructions further cause the processor to generate another digital signature for the blinded certificate by:
   additionally identifying, for each bit in the series that has another value, a corresponding integer; and
   generating as the value d for the other digital signature the product of the additionally identified integers.

10. A system as recited in claim 8, wherein the attributes are security attributes of the client.

11. A system comprising:
    a processor; and
    a memory coupled to the processor, the memory containing instructions that, when executed by the processor, cause the processor to:
       receive, from a client, a request for electronic content;
       check, based on information encoded in a digital signature of at least a portion of the request, whether the client has a set of claimed security attributes;
       determine how to respond to the request based on the check;
       wherein to check whether the client has the set of claimed security attributes is to:
          represent the set of claimed security attributes as a series of bits;
          generate a public key for a certifying authority using the series of bits; and
          use the public key to verify the digital signature; and
       wherein to generate the public key is to:
          identify, for each bit in the series that has a particular value, a corresponding integer; and
          generate as the public key the product of the identified integers.

12. A system as recited in claim 11, wherein to determine how to respond is to determine what quality level of electronic content to provide.

13. A system as recited in claim 11, wherein to determine how to respond is to determine what type of payment to require.

14. A system as recited in claim 11, wherein to determine how to respond is to determine what additional security precautions are required on the part of the client.

15. A system comprising:
    one or more devices;
    means for receiving, from a client, a current certificate and a request to sign a new certificate;
    means for determining attributes of the client based on the current certificate;
    means for selecting, in accordance with public key cryptography, a public/private key pair that is based at least in part on the attributes of the client;
    means for digitally signing the new certificate using the selected private key;
    wherein the means for digitally signing comprises means for calculating a value of a formula $$(\text{blinded certificate})^d \mod(n),$$

wherein d represents a private key of a device performing the digital signing and wherein n is a product of two prime numbers that comprise the private key; and
    wherein the means for selecting comprises:
       means for representing the attributes as a series of bits;
       means for identifying, for each bit in the series that has a particular value, a corresponding integer; and
       means for generating as the value d the product of the identified integers.

16. A system as recited in claim 15, further comprising means for generating another digital signature for the blinded certificate where the means for generating comprises:
    means for additionally identifying, for each bit in the series that has another value, a corresponding integer; and
    means for generating as the value d for the other digital signature the product of the additionally identified integers.

17. A system as recited in claim 15, wherein the attributes are security attributes of the client.

18. A system comprising:
    one or more devices;
    means for receiving, from a client, a request for electronic content;

means for checking, based on information encoded in a digital signature of at least a portion of the request, whether the client has a set of claimed security attributes;

means for determining how to respond to the request based on the checking;

wherein the means for checking comprises:

means for representing the set of claimed security attributes as a series of bits;

means for generating a public key for a certifying authority using the series of bits; and means for using the public key to verify the digital signature; and wherein the means for generating comprises:

means for identifying, for each bit in the series that has a particular value, a corresponding integer; and means for generating as the public key the product of the identified integers.

19. A system as recited in claim 18, wherein the means for determining how to respond comprises one or more of: means for determining what quality level of electronic content to provide, means for determining what type of payment to require, and means for determining what additional security precautions are required on the part of the client.

20. A method comprising:

receiving, from a client, a request for electronic content;

checking, based on information encoded in a digital signature of at least a portion of the request, whether the client has a set of claimed security attributes by determining a public key based on the set of claimed security attributes and using the public key to verify the digital signature, wherein the checking further comprises representing the set of claimed security attributes as a series of bits and generating the public key using the series of bits, and wherein the generating comprises identifying, for each bit in the series that has a particular value, a corresponding integer, and generating as the public key the product of the identified integers; and determining how to respond to the request based on the checking.

21. A method as recited in claim 20, wherein the determining how to respond comprises determining what quality level of electronic content to provide.

22. A method as recited in claim 20, wherein the determining how to respond comprises determining what type of payment to require.

23. A method as recited in claim 20, wherein the determining how to respond comprises determining what additional security precautions are required on the part of the client.

24. A system comprising:

a processor; and a memory coupled to the processor, the memory containing instructions that, when executed by the processor, cause the processor to:

receive, from a client, a request for electronic content;

check, based on information encoded in a digital signature of at least a portion of the request, whether the client has a set of claimed security attributes by determining a public key based on the set of claimed security attributes and using the public key to verify the digital signature, wherein to check whether the client has the set of claimed security attributes is further to represent the set of claimed security attributes as a series of bits and generate the public key using the series of bits, and wherein to generate the public key is further to identify, for each bit in the series that has a particular value, a corresponding integer, and generate as the public key the product of the identified integers; and determine how to respond to the request based on the checking.

25. A system as recited in claim 24, wherein to determine how to respond is to determine one or more of: what quality level of electronic content to provide, what type of payment to require, and what additional security precautions are required on the part of the client.

26. A system comprising:

a processor; and a memory coupled to the processor, the memory containing instructions that, when executed by the processor, cause the processor to perform a method, the method comprising:

receiving, from a client, a request for electronic content;

processing the request to determine, based on information encoded in a digital signature of at least a portion of the request, whether the client has a set of claimed security attributes by determining a public key based on the set of claimed security attributes and using the public key to verify the digital signature, wherein the checking further comprises representing the set of claimed security attributes as a series of bits and generating the public key using the series of bits, and wherein the generating comprises identifying, for each bit in the series that has a particular value, a corresponding integer, and generating as the public key the product of the identified integers; and determining how to respond to the request based on the processing.

27. A system as recited in claim 26, wherein the determining how to respond comprises one or more of: determining what quality level of electronic content to provide, determining what type of payment to require, and determining what additional security precautions are required on the part of the client.

* * * * *